United States Patent [19]
Rhodehamel et al.

[11] Patent Number: 5,778,441
[45] Date of Patent: Jul. 7, 1998

[54] METHOD AND APPARATUS FOR ACCESSING SPLIT LOCK VARIABLES IN A COMPUTER SYSTEM

[75] Inventors: Michael W. Rhodehamel; Nitin V. Sarangdhar; Matthew A. Fisch, all of Beaverton, Oreg.

[73] Assignee: Intel Corporation, Santa Clara, Calif.

[21] Appl. No.: 764,663

[22] Filed: Dec. 11, 1996

Related U.S. Application Data

[63] Continuation of Ser. No. 204,864, Mar. 1, 1994, abandoned.
[51] Int. Cl.$^6$ .............................. G06F 12/00; G06F 13/00
[52] U.S. Cl. .................... 711/154; 364/DIG. 1; 364/243.4; 364/243.41; 364/238.4; 395/487; 395/458; 711/118; 711/150; 711/151; 711/145
[58] Field of Search ................. 364/DIG. 1, 243.4, 364/243.41, 238.4; 395/455, 477, 478, 479, 472, 481, 287-288, 487-488; 711/118, 150, 151, 152, 145, 154

[56] References Cited
U.S. PATENT DOCUMENTS

| | | | |
|---|---|---|---|
| 5,237,694 | 8/1993 | Horne et al. | 395/725 |
| 5,283,870 | 2/1994 | Joyce et al. | 395/200 |
| 5,353,414 | 10/1994 | Iida et al. | 395/325 |
| 5,353,415 | 10/1994 | Wolford et al. | 395/325 |
| 5,404,482 | 4/1995 | Stamm et al. | 395/472 |
| 5,467,295 | 11/1995 | Young et al. | 395/200.05 |

*Primary Examiner*—Tod R. Swann
*Assistant Examiner*—Tuan V. Thai
*Attorney, Agent, or Firm*—Blakely, Sokoloff, Taylor & Zafman

[57] ABSTRACT

Atomicity of lock variables is preserved in a computer system in response to a request by a microprocessor for a bus lock access whether the lock variable is split between two cache lines or is within a single cache line. A non-split lock bus access which can be satisfied by a cacheable region within the same cluster as the microprocessor issuing the access is allowed to complete, regardless of whether ownership of the next level bus is available. If the non-split lock access can not be satisfied within the cluster, then ownership of the next level bus is obtained, if available, to satisfy the access. Similarly, a split lock access may complete if ownership of the second level bus can be obtained. However, a split lock access is aborted if the second level bus ownership is not available, regardless of whether a cacheable region within the same cluster can satisfy the request.

11 Claims, 7 Drawing Sheets

METHOD AND APPARATUS FOR ACCESSING SPLIT LOCK VARIABLES IN A COMPUTER SYSTEM

This is a continuation of application Ser. No. 08/204,864, filed Mar. 1, 1994 now abandoned.

BACKGROUND OF THE INVENTION

1. Field of the Invention

The present invention pertains to the field of computer system buses. More particularly, this invention relates to the field of bus lock operations in a computer system.

2. Background

Lock semantics are often used by multiple bus masters, such as two microprocessors, to communicate with each other. For example, processor 1 may establish a data structure in a memory device for processor 2 to read at some future time. The data structure has a flag, or lock variable, which is initially reset by processor 1. The lock variable is then set by processor 1 after the data structure is established. Thus, by monitoring the lock variable processor 2 is able to determine whether it may safely access the data structure and avoid reading stale data.

The situation may also arise where multiple processors desire access to the data structure. If the data structure can be read from and written to, then it is desirable to ensure that only one of the remaining processors can access the structure at any given time. If the lock variable is set then the remaining processors know the data structure is in use and they cannot access it, whereas if the lock variable is not set then the first processor accessing the lock variable knows the structure is not in use.

To access the data structure the processor must acquire the lock. To acquire the lock, the processor first reads the lock variable to determine whether it is set. If the lock variable is set then the processor will try to acquire the lock at some future time. If the lock variable is not set then the processor writes to the lock variable to set it, thereby preventing any other processor from acquiring the lock or altering the data structure. The processor is then able to proceed with using, and possibly modifying, the data structure. When the processor has completed its access to the data structure it releases the lock by writing a value to the lock variable to clear it, thereby allowing another processor to acquire the lock.

An acquire failure occurs when the lock has been acquired by a first processor and a second processor desires the lock. The second processor reads the value of the lock variable, determines the lock is acquired by another processor, and writes that same value back to the lock variable. Although the second processor writes to the lock variable, the value of the lock variable is not altered. Alternatively, the second processor may read the lock variable, determine the lock is acquired by another processor, and then write no value back to the lock variable.

In a multiprocessor environment, to perform a read or a write to memory over a bus, the processor is allowed access to the bus through bus arbitration. When access to the bus is granted the processor generally performs a single transaction, such as a read or a write. Read and write transactions to main memory over the bus are well-known in the art. In many modern computer systems, circumstances may exist in which the processor must perform an atomic bus operation consisting of multiple transactions. An atomic operation is an operation which requires the transactions to occur on the bus without interruption by another processor. For example, an acquire lock operation must be allowed to read the lock variable and write the lock variable without a second processor performing a read or write between the first processor's read and write. Allowing a second processor to interfere with the first processor's lock operation could result in both processors believing they had access to the data structure, which would destroy the purpose of the lock variable.

One common way of resolving the problem raised by atomic operations is through the use of a LOCK# signal. When the first processor initiates an operation which must not be interrupted, it asserts a LOCK# signal to the bus arbitration unit. The LOCK# signal informs the arbitration unit to leave access to the bus with the first processor rather than giving it to another processor (or any other bus agent) upon completion of the first processor's transaction. Upon completion of the operation the first processor deasserts the LOCK# signal. Thus, in the instance of an acquire lock operation, the first processor is able to read and write to the lock variable without interference from other bus agents and the atomicity of the lock is preserved.

The lock variable is stored in memory and thus has an address and a data value associated with it. The lock variable may be an aligned lock variable or a split lock variable. An aligned lock variable is memory aligned; e.g., if the microprocessor performs 2-byte reads, lock variables in modulo-2 memory address locations are aligned lock variables. A split lock variable is a lock variable which requires the microprocessor to perform two reads to retrieve the data value of the lock variable.

In many modern computer systems one or more agents on the bus contain a cache memory. The cache memory is generally memory which is smaller than main memory but operates substantially faster. Cache memory associated with a particular processor increases the performance of that processor by allowing certain instructions or data to be accessed more quickly.

However, in order to support cache memory in a multiprocessor system, the cache memory associated with a particular processor requires a means for notifying the requesting processor that the requested data is contained in the cache. One way this notification is made is through the use of snoop result signals. The snooping cache memory asserts these snoop result signals, which are received by the requesting processor.

Many computer systems employing multiple microprocessors have multiple cache memories. Thus, in the event of a split lock variable, the cache line containing the first part of the lock variable may be in a first cache whereas the cache line containing the second part of the lock variable may be in a second cache. In such a situation the lock signal must be handled such that the microprocessor is able to read from both the first cache and the second cache without interference from another agent on the bus.

In many modern computer systems, the occurrence of aligned lock variables is far greater than that of split lock variables. Thus, it is desirable to preserve the atomicity of lock variables in an efficient manner for aligned lock variables. At the same time it is also important that split lock accesses be atomic and performed correctly.

Furthermore, in many modern computer systems the occurrence of accesses to lock variables are relatively infrequent compared to all other types of bus accesses. Thus, it would be advantageous to provide a system which performed accesses to split lock variables accurately, yet operated within a pre-existing framework for reads and writes to memory. Such a system would require minimal additional logic complexity, and therefore cost less to implement.

The present invention provides such a solution.

SUMMARY AND OBJECTS OF THE INVENTION

The present invention preserves the atomicity of lock variables in a computer system comprising hierarchical buses and multiple processor clusters. Atomicity is preserved whether the lock variable is split or aligned, and is accomplished by utilizing a small overhead logic over the logic used for non-locked bus accesses.

If the lock access is for a non-split lock variable and can be satisfied by a cache memory within the same cluster as the microprocessor, then the microprocessor is allowed to complete the locked operation. If the lock access can not be satisfied within the cluster then the cluster manager attempts to gain ownership of the next level bus. If the ownership is available then the lock access is allowed to complete; otherwise, the access is aborted and the microprocessor is required to retry the access.

However, if the lock access is for a split lock variable then the cluster manager immediately attempts to gain ownership of the next level bus, even if the first request can be satisfied by a cache or a memory within the same cluster as the microprocessor. Only if the next level bus is available and the cluster manager obtains ownership of the bus does the microprocessor perform the locked operation. If the next level bus is not available then the cluster manager issues a "DEFER" signal to the microprocessor, indicating to the microprocessor to abort the operation. Note that the cluster manager attempts to gain ownership of the next level bus before the microprocessor completes the first request.

In an alternate embodiment, the first read request of a split lock access is completed if it can be satisfied by a cache or a memory within the same cluster as the microprocessor. If the second read request can be satisfied within the same cluster, or the next level bus is available, then the second read request is performed. If, however, the second read request cannot be satisfied within the cluster and the next level bus is not available, then the microprocessor must repeat the entire lock operation and retry both the first and second read requests.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for preserving atomicity of lock variables is described in detail. In the following description for purposes of explanation, specific details such as processor configurations, components, bus hierarchies, etc., are set forth in order to provide a thorough understanding of the present invention. However, it will be understood by one skilled in the art that the present invention may be practiced without these specific details. In other instances, well known structures, devices, functions, and procedures are shown in block diagram form in order not to avoid obscuring the present invention. It should be noted that the present invention can be applied to a variety of different processor architectures. Furthermore, the present invention can be practiced in a variety of manners, such as by a single or multiple chip implementation or by fabrication by silicon, gallium arsanide, or other processes.

Figure 1:
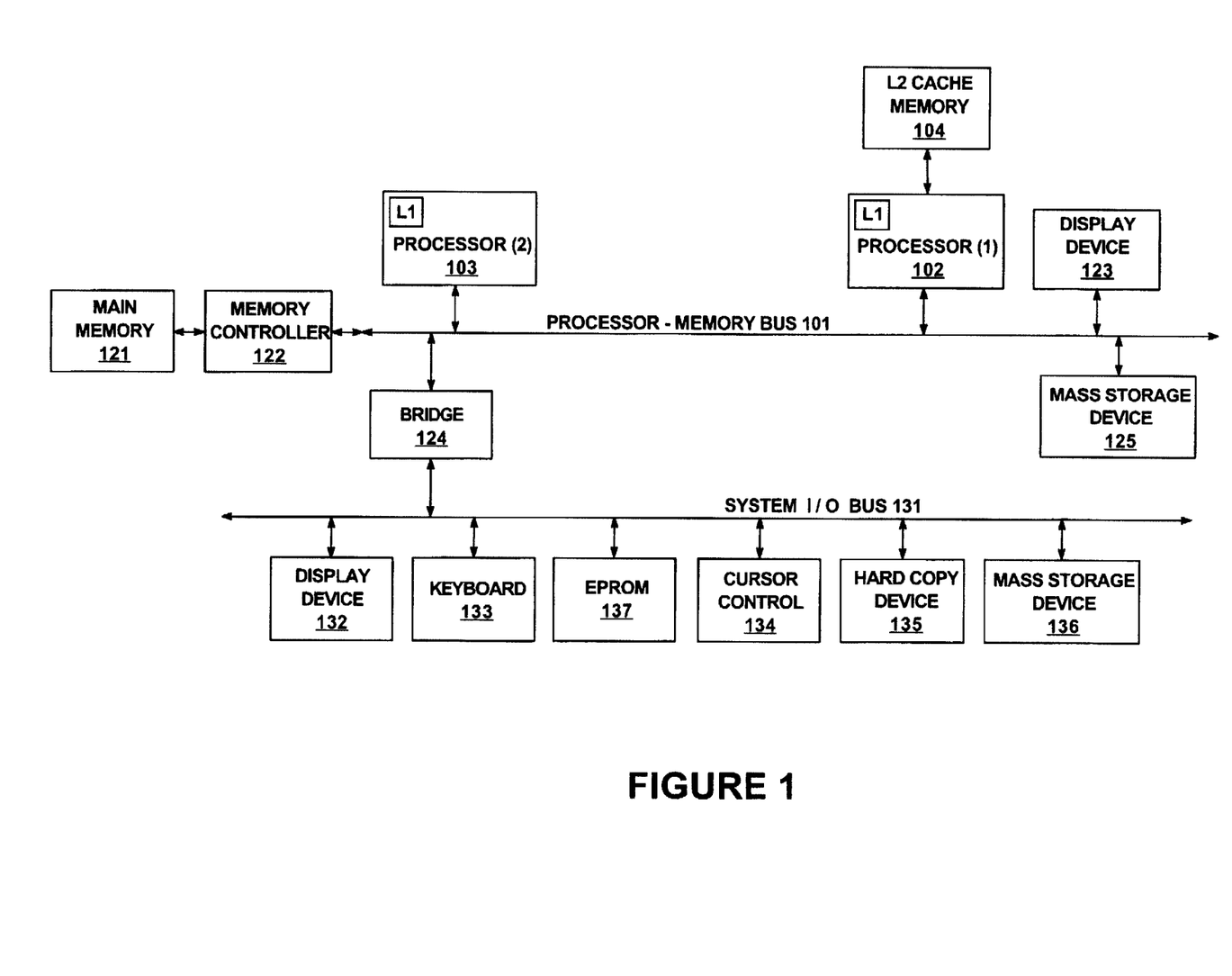
FIG. 1 shows an overview of a multiprocessor computer system of one embodiment of the present invention.

FIG. 1 shows an overview of an example multiprocessor computer system of the present invention. The computer system generally comprises a processor-memory bus or other communication means 101 for communicating information between one or more processors 102 and 103.

Processor-system bus 101 includes address, data and control buses. Processors 102 and 103 may include a small, extremely fast internal cache memory, commonly referred to as a level one (L1) cache memory for temporarily storing data and instructions on-chip. In addition, a bigger, slower level two (L2) cache memory 104 can be coupled to processor 102 for temporarily storing data and instructions for use by processor 102. In one mode, the present invention may include Intel® architecture microprocessors as processors 102 and 103; however, the present invention may utilize any type of microprocessor, and may include processors of different types.

Also coupled to processor-memory bus 101 is processor 103 for processing information in conjunction with processor 102. Processor 103 may comprise a parallel processor, such as a processor similar to or the same as processor 102. Alternatively, processor 103 may comprise a co-processor, such as a digital signal processor. The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processor 102 and processor 103. Memory controller 122 maintains a strong order of read and write operations. A mass data storage device 125, such as a magnetic disk and disk drive, for storing information and instructions, and a display device 123, such as a cathode ray tube (CRT), liquid crystal display (LCD), etc., for displaying information to the computer user are coupled to processor-memory bus 101.

An input/output (I/O) bridge 124 is coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

I/O bus 131 communicates information between peripheral devices in the computer system. Devices that may be coupled to system bus 131 include a display device 132, such as a cathode ray tube. liquid crystal display, etc., an alphanumeric input device 133 including alphanumeric and other keys. etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system bus 131. Additionally, an EPROM device 137 for storing information and instructions may also be coupled to system bus 131.

Some of the devices shown in FIG. 1 are optional and may not be present in some implementations; e.g., a display device may not be present. Certain implementations of the present invention may include additional processors or other components. Additionally, certain implementations of the present invention may not require nor include all of the above components. For example, processors 102 and 103, display device 123, or mass storage device 125 may not be coupled to processor-memory bus 101. Furthermore, the peripheral devices shown coupled to system I/O bus 131 may be coupled to processor-memory bus 101; in addition, in some implementations only a single bus may exist with the processors 102 and 103 through memory controller 122, and peripheral devices 132 through 136 coupled to the single bus.

Figure 2:
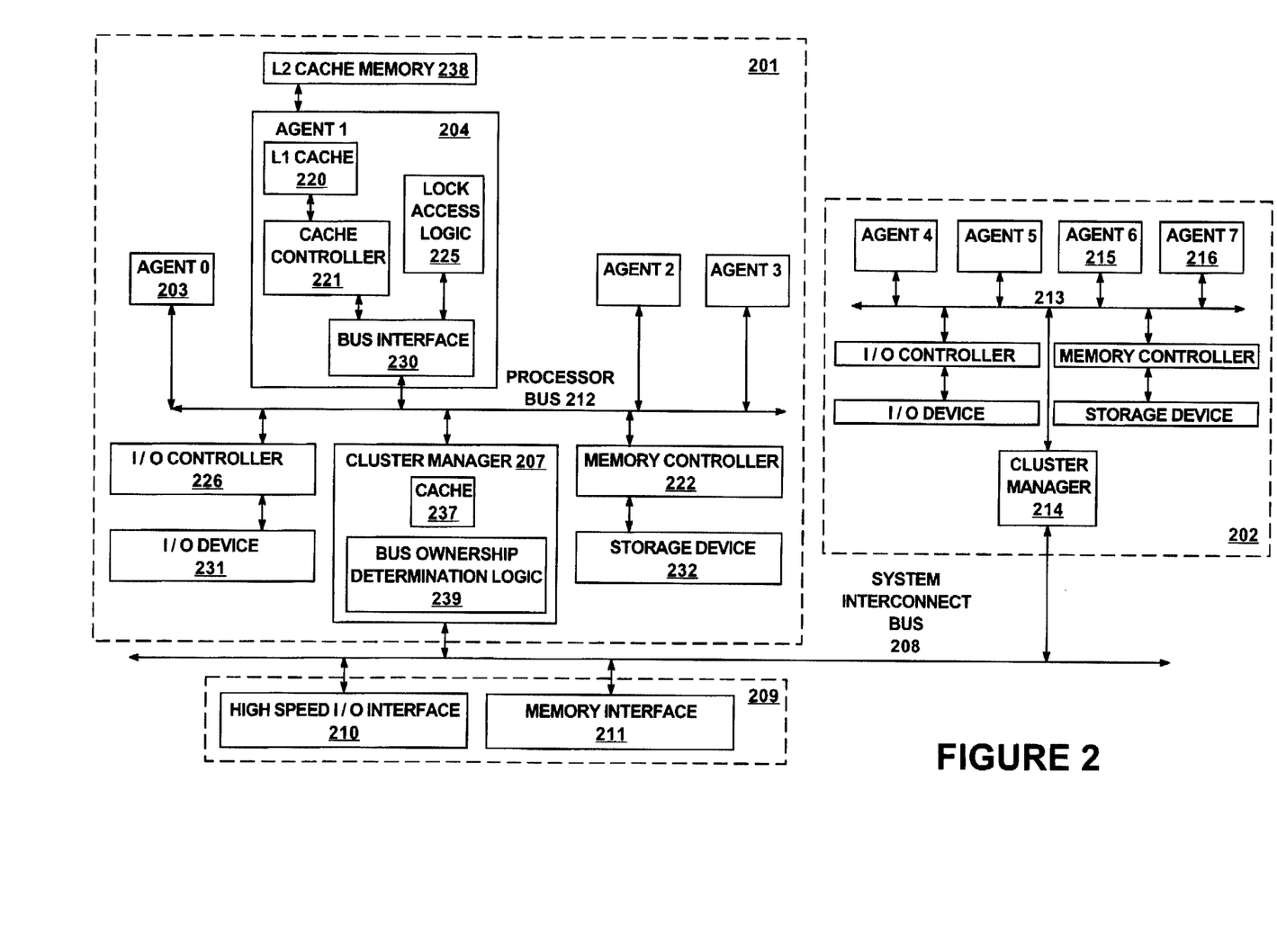
FIG. 2 is a block diagram showing an exemplary bus cluster system of one embodiment of the present invention.

FIG. 2 is a block diagram showing an exemplary bus cluster system of the present invention. The present invention can apply to multiprocessor computer systems having one or more clusters of processors. FIG. 2 shows two such clusters 201 and 202. Each of these clusters are comprised of a number of agents. For example, cluster 201 is comprised of four agents 203–206 and a cluster manager 207, which may include another cache memory 237. Agents 203–206 can include microprocessors, co-processors, digital signal processors, etc. In one embodiment, the cluster agents are microprocessors, each of which includes a L1 cache memory. Each agent may also be coupled to a L2 cache memory, such as L2 cache memory 238 shown coupled to agent 204. Cluster manager 207 and its cache is shared between these four agents 203–206. In one embodiment, cluster manager 207 also includes bus ownership determination logic 239 which interacts with the system interconnect bus arbiter (not shown) to obtain ownership of bus 208, and either asserts or deasserts a DEFER# signal, as discussed below.

Agent 204 includes additional lock access logic 225, which asserts signals on bus 212 through bus interface 230. Lock access logic 225 includes the additional logic to preserve atomicity of lock variables, described in more detail below. Lock access logic 225 determines whether a bus lock operation issued by agent 204 is a split lock operation, and asserts or deasserts a SPLCK# signal accordingly, as discussed below. In addition, lock access logic 225 determines whether the lock operation may be completed or should be aborted, based on whether DEFER# or HITM# signals are received active. The agents which assert these signals, and how lock access logic 225 determines whether they indicate to abort the lock operation, are discussed in more detail below.

Agent 204 also includes a L1 cache memory 220 coupled to a cache controller 221. In one embodiment, cache controller 221 asserts signals on bus 212 and receives signals on bus 212 through bus interface 230. Cache controller 221 checks requests on bus 212 to determine whether cache memory 220 contains a copy of the requested cache line, and checks the state of the cache line as described below. Cache controller 221 may assert a HIT# signal or a HITM# signal, depending on the state of the cache line, as discussed below.

Agent 204 is shown to include additional detail. The remaining agents on processor bus 212, as well as those on processor bus 213 and processor-memory bus 101 of FIG. 1, may also include this additional logic. In one embodiment, all agents on the bus which request lock operations include lock access logic 225, and all agents on the bus with a cache memory include cache controller 221. This additional logic has not been shown in all agents so as not to clutter the drawings.

In one embodiment, each cluster also includes a local memory controller and/or a local I/O controller. For example, cluster 201 may include a local memory controller 222 coupled to processor bus 212. Local memory controller 222 manages accesses to a RAM or other dynamic storage device 232 contained within cluster 201. Cluster 201 may also include a local I/O controller 226 coupled to processor bus 212. Local I/O controller 226 manages accesses to I/O devices within the cluster, such as an I/O device 231.

Each cluster is coupled to a system interconnect bus 208, which in one embodiment is processor-memory bus 101 of FIG. 1. These clusters 201–202 are coupled to various other components of the computer system through a system interface 209. The system interface 209 includes a high speed I/O interface 210 for interfacing the computer system to the outside world and a memory interface 211 which provides access to a remote memory, such as a DRAM memory array.

Certain implementations of the present invention may not require nor include all of the above components. For example, cluster 201 or 202 may comprise fewer than four agents. Additionally, certain implementations of the present invention may include additional processors or other components.

The computer system of the present invention utilizes a writeback configuration with the well-known M.E.S.I. (Modified, Exclusive, Shared, or Invalid) protocol. The caches have tags that include a bit called the modified dirty (altered) bit. This bit is set if a cache location has been updated with new information and therefore contains information that is more recent than the corresponding information in main system memory 121.

The M.E.S.I. protocol is implemented by assigning state bits for each cached line. These states are dependent upon both data transfer activities performed by the local processor as the bus master, and snooping activities performed in response to transactions generated by other bus masters.

M.E.S.I. represents four states. They define whether a line is valid (i.e., hit or miss), if it is available in other caches (i.e., shared or exclusive), and if it is modified (i.e., has been modified). The four states are defined as follows:

[M]—MODIFIED This state indicates a line which is exclusively available in only this cache (all other caches are I), and is modified (i.e., main memory's copy is stale). A Modified line can be read or updated locally in the cache without acquiring the memory bus.

[E]—EXCLUSIVE Indicates a line which is exclusively available in only this cache (all other caches are I), and that this line is not modified (main memory also has a valid copy). An Exclusive line can be read or updated locally in the cache without acquiring the memory bus.

[S]—SHARED Indicates that this line is potentially shared with other caches. The same line may exist in one or more other caches (main memory also has a valid copy). A shared line can be read locally but cannot be updated without gaining ownership of the bus.

[I]—INVALID Indicates that the line is not available in the cache. A read to this cache line will be a miss and cause the cache controller to execute a line fill (i.e., fetch the entire line and deposit it into the cache SRAM).

The states determine the actions of the cache controller with regard to activity related to a line, and the state of a line may change due to those actions. All transactions which may require state changes in other caches are broadcast on the shared memory bus.

In one embodiment of the present invention, a bus transaction contains up to six distinct phases. However, certain phases are optional based on the transaction and response type. A phase uses a particular signal group to communicate a particular type of information. These phases are:

Arbitration Phase
Request Phase
Error Phase
Snoop Phase
Response Phase
Data Transfer Phase In one mode, the Data Transfer Phase is optional and used if a transaction is transferring data. The data phase is request-initiated, if the data is available at the time of initiating the request (e.g., for a write transaction).

The data phase is response-initiated, if the data is available at the time of generating the transaction response (e.g., for a read transaction). A transaction may contain both a request-initiated data transfer and a response-initiated data transfer.

Figure 3:
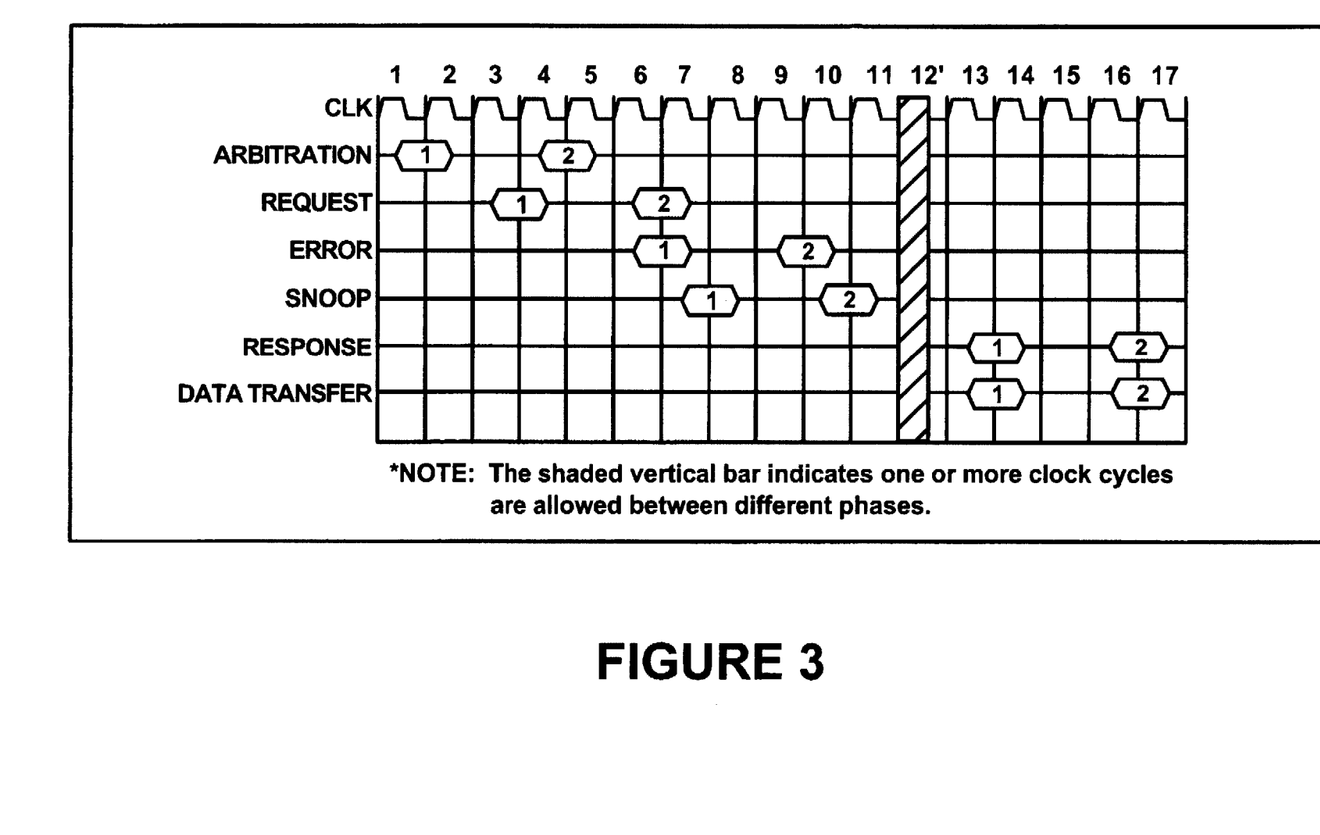
FIG. 3 is a timing diagram in one embodiment of the present invention.

Different phases from different transactions can overlap, thereby pipelining bus usage and improving bus performance. FIG. 3 shows an exemplary timing diagram for overlapped request/response phases for two transactions. Referring to FIG. 3, every transaction begins with an Arbitration Phase, in which a requesting agent becomes the bus owner. The second phase is the Request Phase in which the bus owner drives a request and address information on the bus. The third phase of a transaction is an Error Phase, three clocks after the Request Phase. The Error Phase indicates any immediate errors triggered by the request. The fourth phase of a transaction is a Snoop Phase, four or more clocks from the Request Phase. During the Snoop Phase, all other agents on the bus do a snoop lookup in their caches to determine whether the requested memory address (assuming the issued request did request data) has been modified within their cache. The Snoop Phase indicates if the cache line accessed in a transaction is valid or modified (dirty) in any agent's cache.

The Response Phase indicates whether the transaction failed or succeeded, whether the response is immediate or deferred, and whether the transaction includes data phases. If a transaction contains a response-initiated data phase, then it enters data transfer along with the response phase.

The M.E.S.I. protocol is implemented in the bus cluster system of FIG. 2 utilizing HIT# and HITM# signals. An agent in cluster 201 which has a copy of the requested cache line in Shared or Exclusive state asserts a HIT# signal during the Snoop Phase. Similarly, an agent which has a copy of the cache line in modified state asserts a HITM# signal during the Snoop Phase.

Additionally, cluster manager 207 asserts a DEFER# signal during the snoop phase if ownership of system interconnect bus 208 is not available.

Under normal operation, a processor issuing a request allows the HITM# signal to override the DEFER# signal because the request can be satisfied from a modified line available from a writeback cache in cluster 201.

The processors in one embodiment of the present invention have a 32-byte cache line size and are capable of reading and writing 32 bytes in a single access. The lock variables are 4 bytes; hence, an aligned lock is any lock whose address is 4-byte aligned (i.e., any address which is modulo-4). Thus, the reading of a single cache line is guaranteed to retrieve the entire data value of any aligned lock variable within the cache line. Whether a lock variable is a split lock variable is dependent on whether the variable is stored in cacheable or non-cacheable memory. The processors in one embodiment of the present invention are capable of reading 32 bytes of cacheable memory or 8 bytes of non-cacheable memory in a single access. Thus, a split lock variable is a variable which spans two 32-byte boundaries of cacheable memory or two 8-byte boundaries of non-cacheable memory.

The address of any particular lock variable may or may not be 4-byte aligned. If the address is 4-byte aligned, or the address is not 4-byte aligned but all 4 bytes are contained within a single cacheable line (or contained within a 8-byte span of non-cacheable memory), then a single read retrieves the lock variable. If, however, a cacheable address is not contained within a 32-byte line or a non-cacheable address is not contained within a 8-byte span, then two read transactions are required to retrieve the contents.

In one embodiment of the present invention a split lock operation has a maximum of two read transactions and two write transactions, however it will be understood by those skilled in the art that lock operations having greater than two reads and writes could be easily implemented following the present invention.

Each cache line is internally stored with state bits indicating the cache state. In one embodiment of the present invention, the determination of whether a particular request can be satisfied within the same cluster as the processor issuing the request is based on whether the requested cache line is in a modified state or one of the other three states (exclusive, shared or invalid) in one of the snooping caches. If the cache line is in modified state within one of the snooping caches, then a read lock request within that cluster can be satisfied. That is, no access to the next level bus is necessary because the most recent information for that cache line is within that cluster. The exclusive, shared and invalid states indicate that the cluster manager supplies the cache line; thus, the cluster manager determines if the request requires an access outside the cluster.

Figure 4A:
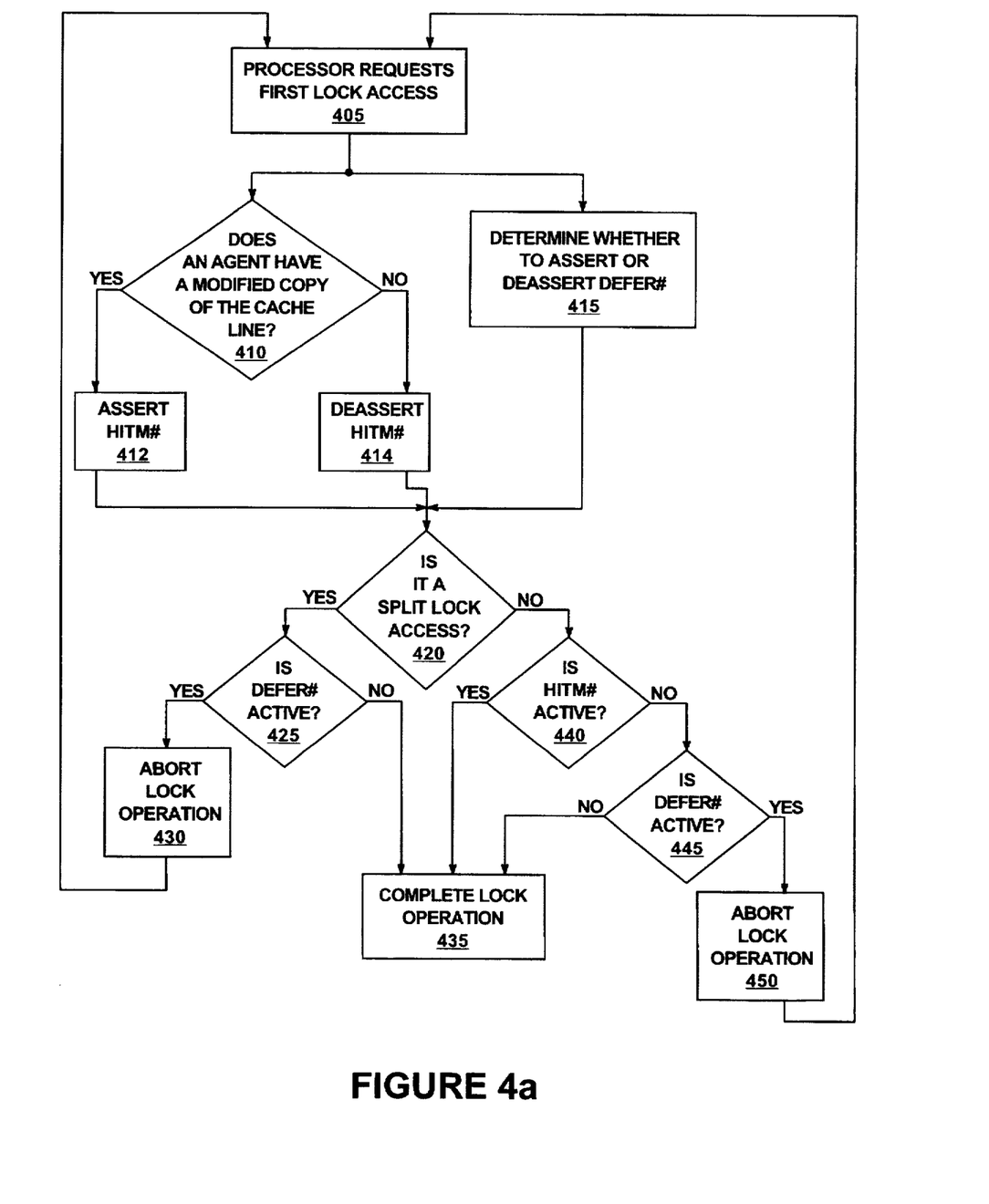
FIG. 4a is a flowchart describing the steps for preserving atomicity of lock variables in one embodiment of the present invention.

FIG. 4a is a flow chart showing the steps followed by one embodiment of the present invention. When processor 203 (or any other potential bus master within cluster 201) requires access to a lock variable it first requests access to the processor bus 212 from the bus arbiter (not shown), step 405.

Processor 203 asserts a LOCK# signal along with this request which informs the arbiter that it is performing a locked operation and it must maintain access to the bus until the operation is completed.

When processor 203 is ready to begin its bus lock operation it issues a first read lock request over processor bus 212 which is received by the cluster manager 207. The other agents 204 to 206 on processor bus 212 are also monitoring the traffic on processor bus 212. When processor 203 issues the request, each agent 204 to 206 checks its cache to determine if it has a modified copy of the requested data, step 410. In addition, cluster manager 207 also determines if its own cache has a modified or exclusive copy of the requested data.

If any agent 204 to 206, does have a modified copy of the requested cache line, then it asserts a HITM# signal during the snoop phase, step 412. The assertion of the HUUM# signal indicates to processor 203 that the request can be satisfied within cluster 201. All agents on the bus which do not have a modified copy of the requested cache line deassert their HITM# signal, step 414.

Concurrent with each agent determining whether to assert or deassert HITM#, cluster manager 207 determines whether to assert or deassert a DEFER# signal, step 415. The steps followed by cluster manager 207 in making this determination are shown in FIG. 4b.

Figure 4B:
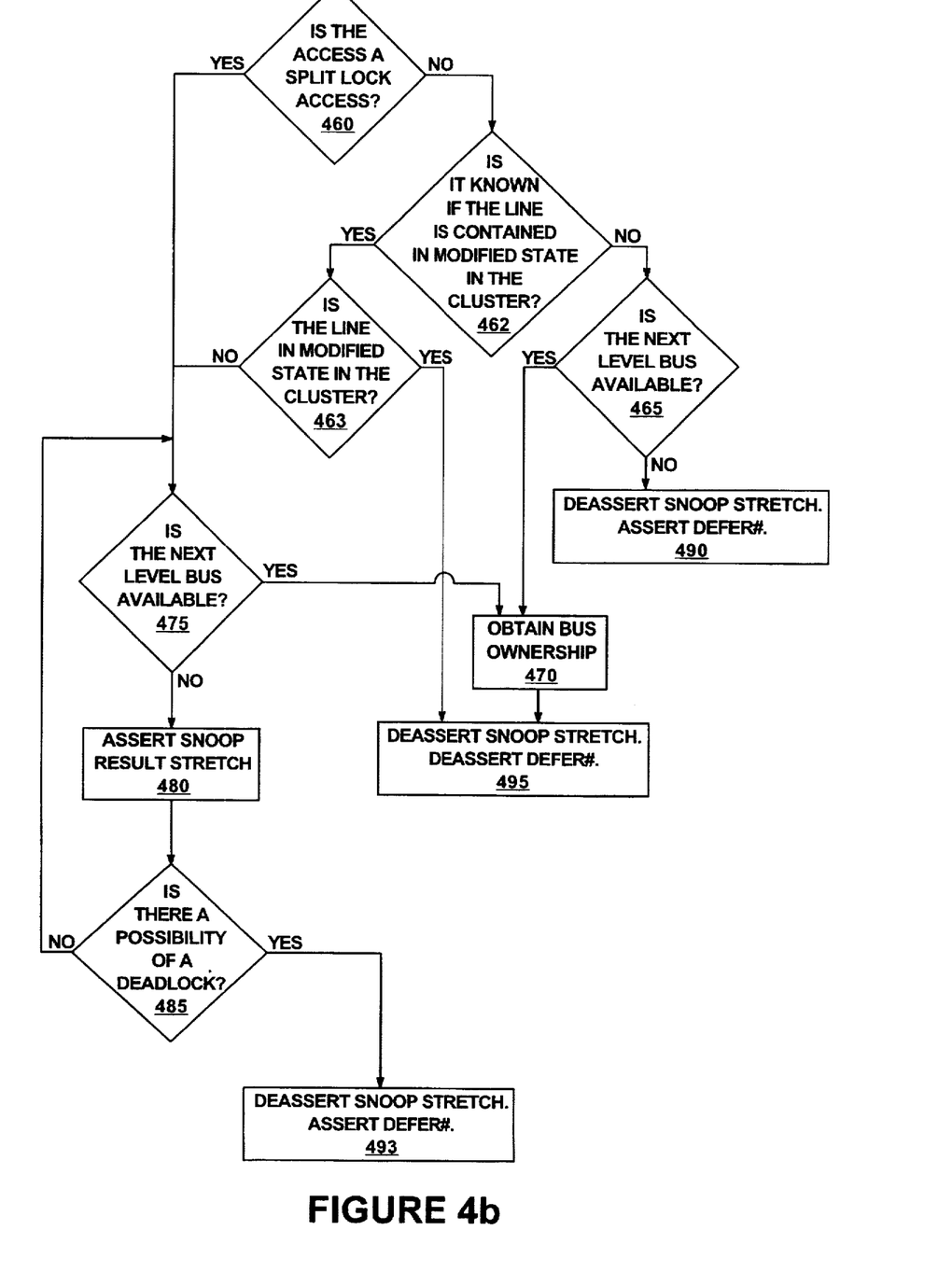
FIG. 4b is a flowchart describing the steps for determining whether to defer a request in one embodiment of the present invention.

FIG. 4b shows a flowchart describing the steps cluster manager 207 follows in determining whether to assert or deassert a DEFER# signal, step 415 of FIG. 4a. Upon receiving a request from processor 203, cluster manager 207 first determines whether the request is a split lock access, step 460.

The DEFER# signal and the HITM# signal are asserted in the Snoop Phase (if they are asserted at all). In one embodiment of the present invention, cluster manager 207 (or any other agent on the bus) can "stretch" the Snoop Phase. That is, cluster manager 207 can extend the Snoop Phase for additional clocks. In one embodiment of the present invention, the snoop result phase is stretched by issuing a HIT# and HITM# signal simultaneously. However, it should be understood by those skilled in the art that the snoop result phase may be extended in other manners, such as by asserting a single "stretch" signal.

As discussed above, processor 203 asserts a LOCK# signal whenever it is issuing a request for a lock operation. In addition, if the lock operation is for a split lock variable, processor 203 also asserts a SPLCK# signal. Processor 203 makes the determination of whether the request is for a split lock variable based on the address of the variable and whether the request is to cacheable or non-cacheable memory, as discussed before.

Based on the SPLCK# signal, cluster manager 207 determines whether the access is for a split lock variable, step 460. If the access is not for a split lock variable, then cluster manager 207 determines whether it is known whether the cache line is contained in the cluster in a modified state, step 462. That is, certain circumstances may exist in which cluster manager 207 does not know if the cache line is in a modified state in the cluster. If cluster manager 207 does know whether the cache line is in a modified state in the cluster, then it makes that determination, step 463. This determination is made based on whether a HITM# signal is asserted within the cluster. If the cache line is in modified state, then, since cluster manager 207 knows the access is not a split lock access, the lock operation can complete. Thus, cluster manager 207 deasserts the snoop result stretch signal (if it was asserted) and deasserts a DEFER# signal, step 495. It should be noted that ownership of the next level bus is not needed because the operation can be satisfied within the cluster 201.

However, if cluster manager 207 determines in step 463 that the cache line is not in modified state within the cluster, then cluster manager 207 determines whether the next level bus is available, step 475. The steps followed by cluster manager after step 475 are described in more detail below.

Returning to step 462, if it is not known whether the line is contained within the cluster in a modified state, then cluster manager 207 determines whether the next level bus, system interconnect bus 208, is available, step 465. If ownership of the next level bus is not available (e.g., another agent is transferring a request over the bus), then cluster manager 207 deasserts the snoop result stretch signal (if it was asserted) and asserts a DEFER# signal, step 490.

If, however, system interconnect bus 208 is available then cluster manager 207 obtains ownership of the bus, step 470. Bus ownership is obtained from the system interconnect bus arbiter (not shown), which operates in a conventional manner. The LOCK# signal is also asserted to the system interconnect bus arbiter to inform the arbiter that ownership of the bus must remain with cluster manager 207 until the operation is complete. Cluster manager 207 also deasserts the snoop result stretch signal (if it was asserted) and deasserts a DEFER# signal, step 495, thereby indicating to processor 203 that ownership of the next level bus is available.

Returning to step 460, if the SPLCK# signal is asserted then cluster manager 207 knows the request is the first read request for a split lock variable. As in step 465, cluster manager 207 determines whether ownership of the next level bus, system interconnect bus 208, is available, step 475. If ownership of the bus is available, then cluster manager 207 obtains ownership of the bus, step 470, and deasserts a snoop result stretch signal (if it was asserted) while issuing a DEFER# signal, step 495, as discussed above.

If, however, ownership of the next level bus is not available, cluster manager 207 asserts a stretch snoop result signal, step 480. This signal informs all other agents on bus 212 that cluster manager 207 is attempting to gain ownership of the next level bus, but that ownership is not immediately available. The snoop result phase of the bus, therefore, is extended as long as possible, e.g., until ownership of the bus becomes available, a possible deadlock situation arises, or the signal times out.

Cluster manager 207 then determines whether a possible deadlock exists, step 485. In some situations, the current transaction on bus 208 may not address cluster manager 207 or cluster 201 in any way. In such situations, cluster manager 207 can wait for access to the bus, shown by repeating steps 475 through 485. Under some circumstances, however, the current transaction on bus 208 may require access to cluster 201, thus it would not be possible for cluster manager 207 to simply wait for the bus. For example, cluster manager 214 may own the bus 208 and be making a request which requires access to processor bus 212. In such a situation, a deadlock would occur if cluster manager 207 waited for bus 208 to become available because bus 208 will not be available until cluster manager 207 allows the request from cluster manager 214 to access processor bus 212.

Thus, if a transaction on system interconnect bus 208 requires access to cluster manager 207, then a possible deadlock situation exists. In response, cluster manager 207 deasserts the snoop result stretch signal and asserts a DEFER# signal, step 493, to avoid a deadlock.

Returning to FIG. 4a, after the agents on processor bus 212 determine whether to assert or deassert a HITM# signal, and cluster manager 207 determines whether to assert or deassert a DEFER# signal, the steps followed according to this embodiment of the present invention are dependent on whether the access is for a split lock variable, step 420. As discussed above, cluster manager 207 determines whether the access is for a split lock variable based on the assertion of the SPLCK# signal from processor 203.

If the access is for a split lock variable, then completion of the access is dependent on whether a DEFER# signal from cluster manager 207 is active, step 425. If the DEFER# signal is active, then processor 203 knows ownership of the next level bus is not available and therefore aborts the lock operation, step 430, rather than tying up processor bus 212. Processor 203 is then able to retry the lock operation at a later time, step 405.

However, if the DEFER# signal from cluster manager 207 is inactive, then processor 203 knows cluster manager 207 has ownership of the next level bus. Thus, processor 203 is able to complete the split lock operation, step 435, because regardless of where the cache lines are located, processor 203 is able to access them.

It should be noted that cluster manager 207 of this embodiment of the present invention obtains ownership of all cache lines to satisfy the second read request regardless of who owns the second cache line. That is, cluster manager 207 obtains ownership of the busses outside of cluster 201. Thus, the situation could arise in which the cluster manager 207 owns the second cache line but issues a retry response because system interconnect bus 208 is not available. Such situations arise rarely, however, and the impact on the system efficiency is negligible.

Returning to step 420, if the access by processor 203 is not for a split lock variable, then processor 203 determines whether a HITM# signal is active, step 440. If a HITM# signal is active, then processor 203 knows the lock operation can be satisfied within cluster 201. Since it is a non-split lock access, only a single read transaction is necessary and thus, the lock operation is allowed to complete, step 435.

However, if no HITM# signal is active, then processor 203 knows the lock operation is not guaranteed to be satisfied within cluster 201. Thus, processor 203 evaluates whether a DEFER# signal from cluster manager 207 is active, step 445. If no DEFER# signal is active then processor 203 knows it can access the bus and cache lines outside of cluster 201, and therefore can complete its lock operation, step 435. However, if a DEFER# signal from cluster manager 207 is active, then processor 203 knows that access to cache lines outside of cluster 201 can not be guaranteed. Thus, the lock operation should be aborted, step 450. As above, processor 203 is able to retry the lock operation at a later time, step 405.

It should be noted that when the HITM# signal is inactive both aligned and split lock variables receive identical treatment. That is, if DEFER# is inactive the lock operation is completed, whether it requires a single or multiple read transactions. Similarly, if DEFER# is active, then the lock operation is aborted, regardless of the number of read transactions required.

It should be noted that the requesting agent distinguishes between a split lock operation and an aligned lock operation, however the agent issuing the HITM# signal does not. That is, the responding agent performs the data transfer over processor bus 212, and the requesting agent chooses whether to take the data off of bus 212. If the lock operation is being aborted then the requesting agent ignores the data on the bus. However, if the lock operation is not aborted then the requesting processor takes the data off the bus. Since the responding agents do not distinguish between split and aligned lock operations, logic complexity within the responding agents is reduced.

It should also be noted that, under non-locked operation, and also for non-split lock variables, processor 203 allows the assertion of a HITM# signal to override the assertion of a DEFER# signal. That is, if processor 203 is making a request and cluster manager 207 informs it that the next level bus is not available, processor 203 completes the operation when the request can be satisfied by a cache within the cluster (i.e., a HITM# signal is asserted).

However, when issuing a request for a split lock variable, processor 203 allows the DEFER# signal to override the HITM# signal. Thus, even if the first request of the split lock operation can be satisfied by a cache within cluster 201, processor 203 aborts the operation if the next level bus is not available.

Figure 5:
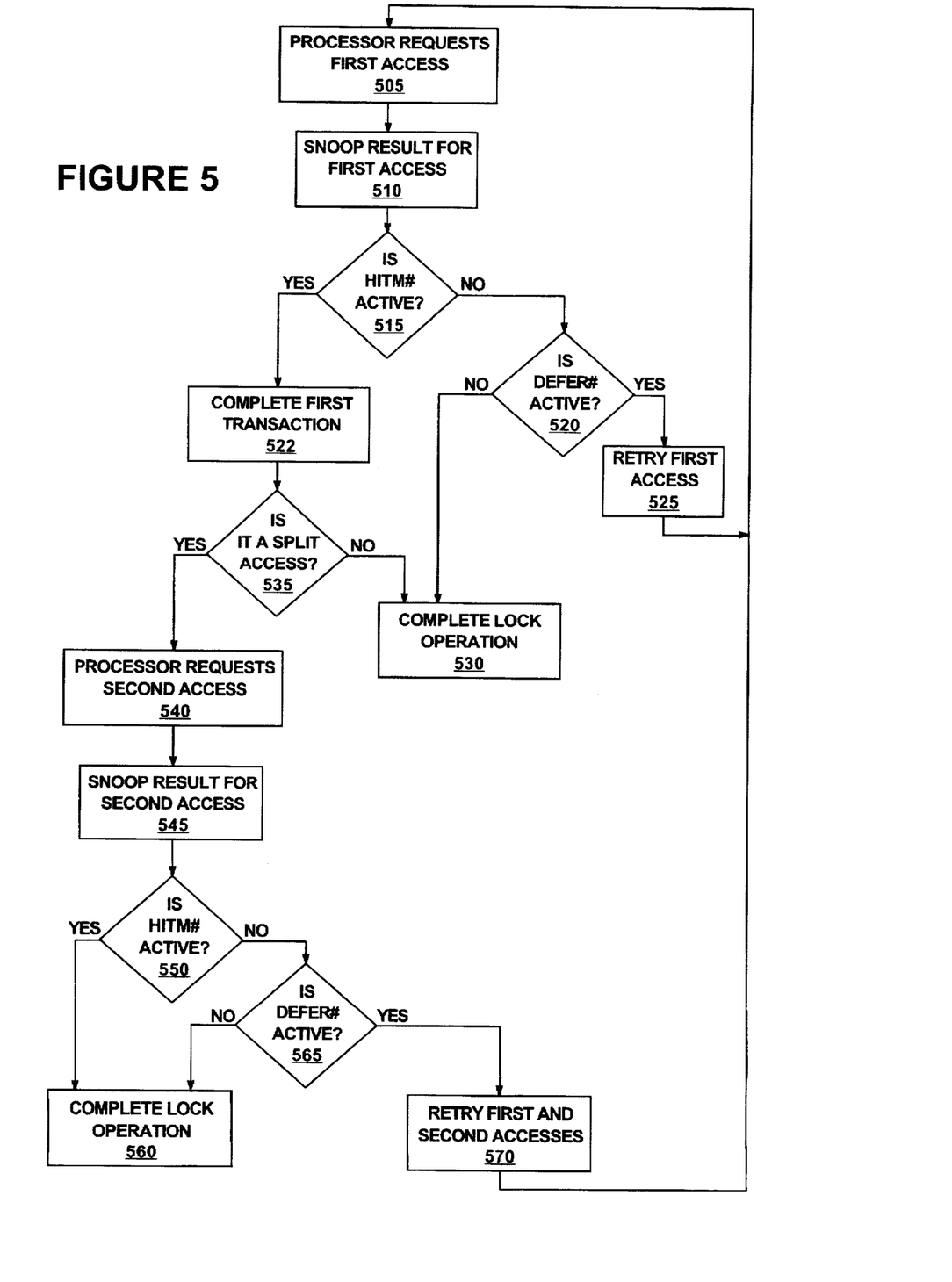
FIG. 5 is a flowchart showing the steps for preserving atomicity of lock variables in an alternate embodiment of the present invention.

FIG. 5 shows the steps of an alternate embodiment of the present invention. The embodiment in FIG. 5 is similar to the embodiment shown in FIG. 4a, however the data value for the first read lock request is returned to processor 203, which accepts the data, if the data is available in cluster 201. Processor 203 is only concerned with ownership of the system interconnect bus 208 if the access is a split lock access and the first or second request cannot be satisfied within the cluster. Thus, the alternate embodiment shown in FIG. 5 does not abort a lock operation unless part of the operation requires it. In the event the next level bus is needed for the second request, but is not available, processor 203 reissues both the first and second requests and ignores the data retrieved by the first request.

When processor 203 receives access to processor bus 212 it issues a first read lock request over processor bus 212, which is received by cluster manager 207, step 505. The other agents on processor bus 212 also monitor the request and either assert or deassert signals during the snoop phase, step 510. Thus, a processor asserts a HITM# signal in step 510 if it has a modified copy of the requested data in its cluster.

Concurrent with the agents determining whether they have a modified copy of the requested cache line, cluster manager 207 determines whether ownership of the next level bus is available. If the next level bus ownership is available then cluster manager 207 obtains ownership of the bus and deasserts a DEFER# signal. Bus ownership is obtained from the system interconnect bus arbiter (not shown). The LOCK# signal is also asserted to the next level bus arbiter to inform the arbiter that ownership of the bus must remain with the cluster manager 207 until the operation is complete. However, if the next level bus ownership is not available then cluster manager 207 asserts a DEFER# signal.

In one mode, cluster manager 207 operates as shown in FIG. 4b, but bypasses step 460. That is, cluster manger 207 follows the steps shown in FIG. 4b, except that cluster manager 207 begins at step 462, rather than step 460. Thus, cluster manager 207 determines whether the bus is available and may determine if any deadlock situations exist.

Upon receiving the signals from the other processors during the snoop phase, processor 203 determines whether a HITM# signal is active, step 515. The HITM# signal informs processor 203 whether the request can be satisfied within cluster 201. If the HITM# signal observed is not active then processor 203 determines whether the DEFER# signal from cluster manager 207 is active, step 520. If the DEFER# signal is active, then system interconnect bus 208 is not available. Thus, processor 203 knows the lock operation can not be satisfied within cluster 201 and that ownership of cache lines outside cluster 201 are not available. Therefore, processor 203 aborts the entire lock operation and must retry the first access, step 525. Processor 203 is allowed to retry the operation at a later time, step 505.

However, if the DEFER# signal is not active, then system interconnect bus 208 is available. Thus, processor 203 knows that the lock operation can complete, whether within cluster 201 or outside cluster 201, because access to cache lines outside cluster 201 is available. Processor 203 then completes the lock operation, step 530.

Returning to step 515, if the HTM# signal is active then the first read transaction can be satisfied within cluster 201. Processor 203 completes the first access, receiving the data value for the first read request, step 522. Processor 203 does not consider whether the DEFER# signal from cluster manager 207 is active or inactive in completing the first transaction.

The steps followed according to this embodiment of the present invention are dependent on whether the first request by processor 203 is part of a split lock access, step 535. Whether the first read is part of a split lock access is determined based on the assertion of the SPLCK# signal, as described above. If the operation is not a split lock access, then processor 203 completes the lock operation, step 530. The completion of the lock operation may or may not include writing a value to memory, as discussed above.

If the operation is a split lock access, then processor 203 issues the second read request after receiving the value for the first read request, step 540. It should be noted that processor 203 does not immediately use the value received on the first read internally to allow for the possibility that the second read may be retried. Processor 203 determines whether the second read request can be satisfied within cluster 201 based on the results in the snoop phase for the second request, step 545, based on whether a HITM# signal is active, as described above.

If a HITM# signal is active, then the second read request can be satisfied within the cluster. Thus, the lock operation is able to complete, step 560. The data value for the second read request is returned to processor 203 and two write requests are issued, if necessary.

However, if a HITM# signal is not active, then the completion of the second read request is dependent on whether a DEFER# signal from cluster manager 207 is active, step 565. If a DEFER# signal is not active then processor 203 knows cluster manager 207 has access to the next level bus and that processor 203 therefore has access to all cache lines in the system, as described above. Thus, processor 203 completes the lock operation, step 560.

If, however, a DEFER# signal is active, then processor 203 knows ownership of the next level bus is not available. The deassertion of the HITM# signals in step 550 informed processor 203 that the request could not be satisfied within cluster 201; thus, processor 203 aborts the operation, step 570.

The abortion of the lock operation requires processor 203 to retry the entire lock operation. That is, both the first and second read requests must be repeated. Thus, processor 203, and every other potential bus master, must include additional logic complexity to ignore the data value received from the first read request. In one embodiment, this additional logic comprises a temporary buffer which stores the first request results until the outcome of the second request is known. It should be noted that this embodiment guarantees successful completion of a lock operation (whether split or otherwise) which can be satisfied entirely within the cluster, regardless of the availability of the next level bus.

Figure 6:
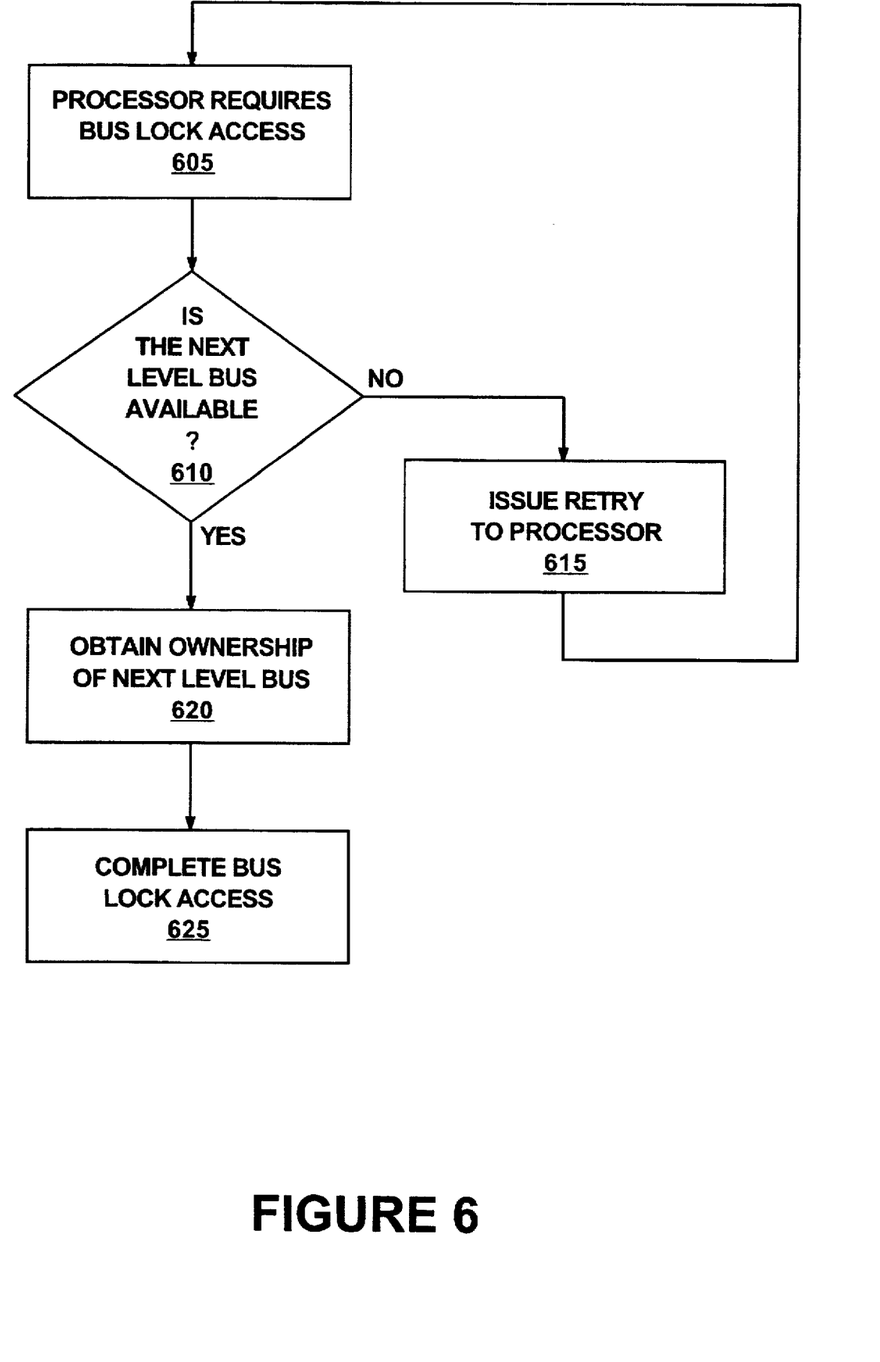
FIG. 6 is a flowchart showing the steps for preserving atomicity of lock variables in another alternate embodiment of the present invention.

FIG. 6 shows the steps of an alternate embodiment of the present invention. When processor 203 needs access to a lock variable it first requests access to the processor bus 212 from the processor bus arbiter (not shown), step 605. When processor 203 receives access to the processor bus 212 it issues a first read lock request over processor bus 212 which is received by the cluster manager 207. Cluster manager 207 immediately determines whether the next level bus, system interconnect bus 208, is available, step 610. If system interconnect bus 208 is not available, then the cluster manager 207 issues a retry response to processor 203, step 615. This frees up processor bus 212 for other traffic, rather than tying up the processor bus waiting for system interconnect bus 208 to become available.

If, however, system interconnect bus 208 is available then cluster manager 207 obtains ownership of the bus, step 620. Bus ownership is obtained from the system interconnect bus arbiter (not shown). The LOCK# signal is also asserted to the system interconnect bus arbiter to inform the arbiter that ownership of the bus must remain with the cluster manager 207 until the operation is complete. The lock operation is then completed, step 625, assuming a retry response is not issued due to the inability to obtain access to a bus within another cluster.

It should be noted that completion of the lock operation may possibly be completed solely within cluster 201, even though ownership of system interconnect bus 208 has been obtained. Thus, this alternate embodiment has the advantage of always preserving atomicity of split lock variables, regardless of the location of the lock variables. However, lock operations which could be satisfied within the cluster 201 are aborted due to unavailability of the next level bus.

Another alternate embodiment allows the requesting agent, processor 203, to issue both addresses before receiving a response. That is, processor 203 issues the first request followed by the second request. The cluster manager 207 receives both addresses but does not issue a DEFER# signal until both addresses are evaluated. Thus, if both requests can be satisfied within the cluster then the lock operation proceeds regardless of the availability of the system interconnect bus 208. The cluster manager 207 does not need to issue the DEFER# signal unless the system interconnect bus 208 is needed to satisfy either request and the cluster manager 207 does not have access to the bus 208.

Another alternate embodiment is similar to the alternate embodiment of FIG. 5, however allows for a retry up to the first write access. That is, in a split lock variable operation the two read requests may be successful, however the write requests may be unsuccessful. Under certain circumstances, a split lock operation which has obtained ownership of the next level bus may not be able to complete. For example, returning to FIG. 1, the situation may arise where the read requests are serviced by main memory 121 but the write requests must be made to EPROM 137. The read request would complete successfully if processor-memory bus 101 were available, however system-I/O bus 131 may not be available to complete the write requests. In this alternate embodiment, the first write request may be allowed a retry response, in the event access to system bus 131 is unavailable. That is, processor 203 ignores the values already read in for the lock variable and any processing that has been performed on them.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for preserving atomicity of lock variables has been described.

What is claimed is:

1. A method for accessing a lock variable in a computer system by an agent using a lock operation, said lock operation including a first request and a second request, said computer system having a first memory coupled to a first bus and a second memory coupled to a second bus, said method comprising the steps of:

(a) issuing said first request on said first bus;

(b) indicating whether said lock operation is a split lock operation;

(c) determining, upon receipt of said first request, whether control of said second bus is available, including, (c1) determining whether a possible deadlock situation exists between the first request and another request issued by another agent on said second bus, and (c2) extending a period for determining whether control of said second bus is available;

(d) determining, upon receipt of said first request, whether said first request can be satisfied by said first memory;

(e) determining whether a path to said second memory is available; and (f) if said lock operation is a split lock operation, then completing said first request only if control of said second bus is available regardless of whether said first request can be satisfied by said first memory.

2. The method of claim 1 further comprises the step of issuing a signal to said agent indicating to complete said lock operation if control of said second memory is available.

3. The method of claim 1 further comprising the step of obtaining control of said second bus.

4. The method of claim 3 further comprising the step of completing said lock operation by issuing a third and a fourth request.

5. The method of claim 4 wherein said first request and said second request are read requests and said third request and said fourth request are write requests.

6. A method for responding to a lock operation issued by an agent in a computer system, said lock operation including a first request and a second request, said computer system having a first memory coupled to a first bus and a second memory coupled to a second bus, said method comprising the steps of:

(a) receiving a first signal from said agent, said first signal indicating said first request is part of said lock operation;

(b) receiving a second signal from said agent, said second signal indicating said lock operation is a split lock operation;

(c) determining whether to abort said lock operation based on a state of said second signal;

(d) determining, upon receipt of the first request, whether control of said second bus is available, including, (d1) determining whether a possible deadlock situation exists between said first request and another request issued by another agent coupled to said second bus, (d2) extending a period for determining whether control of said second bus is available;

(e) determining, upon receipt of said first request, whether said first request can be satisfied by said first memory; and (f) if said lock operation is a split lock operation, then completing said first request only if control of said second bus is available regardless of whether said first request can be satisfied by said first memory.

7. The method of claim 6, further comprising the step of issuing a third and a fourth request as part of said lock operation.

8. The method of claim 7 wherein said first request and said second request are read requests and said third request and said fourth request are write requests.

9. A computer system comprising:

a first bus;

a first memory coupled to said first bus;

a second bus;

a second memory coupled to said second bus;

a first agent coupled to said first bus, said first agent to access a split lock variable by issuing a split lock operation on said first bus wherein said split lock operation includes a first request;

wherein a memory controller corresponding to said first memory is operative to indicate whether said first request can be satisfied by said first memory;

a second agent, coupled to said first bus, to determine whether control of said second bus is available and to indicate to said first agent whether control of said second bus is available;

wherein said second agent is operative to determine whether a possible deadlock situation exists between said first request and another request issued by another agent coupled to said second bus;

said second agent is also operative to extend a period for determining whether control of said second bus is available; and said first agent being operative to complete said lock operation only if said second bus is available regardless of whether said first request can be satisfied by said first memory.

10. An apparatus coupled to a first bus and a second bus, the apparatus comprising:

means for receiving a first request from an agent coupled to said first bus;

means for receiving a first signal from said agent indicating said first request received from said agent is part of a lock operation;

means for receiving a second signal from said agent indicating said lock operation is a split lock operation;

means for determining whether said first request of said lock operation can be satisfied by accessing a first memory, wherein said means for determining is coupled to said first bus;

means for ascertaining whether a path to a second memory and control of said second bus is available, wherein said means for ascertaining is coupled to said first bus;

means for obtaining ownership of said path, wherein said means for obtaining is coupled to said means for ascertaining;

means for indicating whether said lock operation accesses a split lock variable;

means for completing, if said lock operation accesses said split lock variable, said first request only if said path to said second memory and control of said second bus is available regardless of whether said first request can be satisfied by said first memory;

means for determining whether a possible deadlock situation exists between said first request and another request issued by another agent coupled to said second bus; and means for extending a period for determining whether control of said second bus is available.

11. A computer system comprising:

a first bus operative to be coupled to a first memory;

a second bus operative to be coupled to a second memory;

a first agent, coupled to said first bus, to receive a lock operation via said first bus, said lock operation including a first request and a second request, said first agent being operative to receive both a first signal and a second signal via said first bus, said first signal indicating whether said first request is part of said lock operation and said second signal indicating whether said lock operation accesses a split lock variable, said first agent being further operative to determine, upon receipt of the first request, whether control of said second bus is available;

said first agent being further operative to determine, upon receipt of said first request, whether said first request can be satisfied by said first memory, and if said lock operation accesses said split lock variable, then to allow completion of said first request only if control of said second bus is available regardless of whether said first request can be satisfied by said first memory;

a second agent, coupled to said first bus, for indicating to said first agent, based on a state of said second signal, whether said first agent is to abort said lock operation;

wherein said second agent is operative to determine whether a possible deadlock situation exists between said first request and another request issued by another agent coupled to said second bus; and said second agent is also operative to extend a period for determining whether control of said second bus is available.

* * * * *

UNITED STATES PATENT AND TRADEMARK OFFICE
CERTIFICATE OF CORRECTION

PATENT NO. : 5,778,441
DATED : July 7, 1998
INVENTOR(S) : Rhodehamel et al.

It is certified that error appears in the above-identified patent and that said Letters Patent is hereby corrected as shown below:

In column 9 at line 6 delete "HUUM " and insert --HITM--

In column 13 at line 1 delete "HTM " and insert --HITM--

Signed and Sealed this

First Day of December, 1998

*Attest:*

BRUCE LEHMAN

*Attesting Officer*     *Commissioner of Patents and Trademarks*